United States Patent [19]
Minoya et al.

[11] Patent Number: 6,104,869
[45] Date of Patent: Aug. 15, 2000

[54] METHOD OF CONTROLLING A WORK FLOW SYSTEM

[75] Inventors: Manabu Minoya; Katsunari Tsuri, both of Odawara; Hiroshi Kuwabara, Hiratsuka, all of Japan

[73] Assignee: Hitachi, Ltd., Tokyo, Japan

[21] Appl. No.: 08/652,089

[22] Filed: May 23, 1996

[30] Foreign Application Priority Data

May 31, 1995 [JP] Japan ................................ 7-134308

[51] Int. Cl.[7] .................................................. G06F 17/00
[52] U.S. Cl. ........................................................ 395/200.34
[58] Field of Search ............................ 395/200.34, 674, 395/676; 705/8, 9

[56] References Cited

U.S. PATENT DOCUMENTS

| | | | |
|---|---|---|---|
| 5,392,430 | 2/1995 | Chen et al. ............................. | 395/676 |
| 5,420,801 | 5/1995 | Dockter et al. ........................ | 395/676 |
| 5,467,268 | 11/1995 | Sisley et al. .............................. | 705/8 |
| 5,592,671 | 1/1997 | Hirayama ............................. | 395/674 |
| 5,642,508 | 6/1997 | Miyazama ............................. | 395/674 |

FOREIGN PATENT DOCUMENTS 6131395A   5/1994   Japan .

*Primary Examiner*—Ellis B. Ramirez
*Attorney, Agent, or Firm*—Kenyon & Kenyon

[57] ABSTRACT

In a work flow system in which work defined beforehand with respect to data processing is executed by a plurality of workers in a plurality of nodes connected to each other through an information network, data processed in a branch source node is divided into split data so that the split data are distributed to some branch destination nodes. The split data processed in the respective branch destination nodes are connected as input data to be given to a connecting destination node. A work flow control engine sets data start and end positions of each of the split data, split data information, and connection data information into a dividing/connecting information table. The work flow control engine renews the data start and end positions in the dividing/connecting information table in accordance with increase/decrease of the split data processed in each of the branch destination nodes.

19 Claims, 8 Drawing Sheets

FIG.2

| NODE NAME 201 | WORKER NAME 202 | PRECEDING NODE 203 | SUCCEEDING NODE 204 | DIVIDING 205 | CONNECTING 206 |
|---|---|---|---|---|---|
| N1 | TANAKA | NONE | N2,N3,N4 | on | off |
| N2 | SUZUKI | N1 | N5 | off | off |
| N3 | YAMADA | N1 | N6 | off | off |
| N4 | HONDA | N1 | N6 | off | off |
| N5 | NAKAYAMA | N2 | N7 | off | off |
| N6 | SATO | N3,N4 | N7 | off | on |
| N7 | ISHIDA | N5,N6 | NONE | off | on |

200 NODE INFORMATION MANAGEMENT TABLE

FIG.3

| ID | NODE | STATUS | DATA START PAGE | DATA END PAGE |
|---|---|---|---|---|
| T1 | N1 | EXECUTED | S00 | E00 |
|  | N2 | EXECUTED | S11 | E11 |
|  | N3 | EXECUTED | S12 | E12 |
|  | N4 | IN EXECUTION | S13 | E13 |
|  | N5 | EXECUTED | S11 | E11 |
|  | N6 | WAIT-FOR |  |  |
|  | N7 | WAIT-FOR |  |  |
| T2 | N1 | WAIT-FOR |  |  |
|  | N2 | WAIT-FOR |  |  |
|  | N3 | WAIT-FOR |  |  |
|  | N4 | WAIT-FOR |  |  |
|  | N5 | WAIT-FOR |  |  |
|  | N6 | WAIT-FOR |  |  |
|  | N7 | WAIT-FOR |  |  |
| T3 | ... | ... |  |  |
|  | ... | ... |  |  |
|  | ... | ... |  |  |

300 TRANSACTION MANAGEMENT TABLE

FIG.4

400 DIVIDING / CONNECTING INFORMATION MANAGEMENT TABLE

| DATA NAME SUFIX | NODE NAME | NUMBER OF DIVISIONS | DIVISIONAL DATA | CONNECTED DATA | START | END | CONNECTING SEQUENCE |
|---|---|---|---|---|---|---|---|
| 00 | N1 | 3 | 11,12,13 | | S00 | E00 | |
| 11 | N2 | 0 | | | S11 | E11 | |
| 12 | N3 | 0 | | | S12 | E12 | |
| 13 | N4 | 0 | | | S13 | E13 | |
| 21 | N6 | 0 | | 12,13 | S21 | E21 | 12+13 |
| 31 | N7 | 0 | | 11,21 | S31 | E31 | 11+21 |

401 402 403 404 405 406 407 408

METHOD OF CONTROLLING A WORK FLOW SYSTEM

BACKGROUND OF THE INVENTION

The present invention relates to a work flow system control technique, and particularly to a technique which can be applied effectively to a work flow system control in which work is moved electronically between small-scale groups or between large-scale sections.

In the industrial field such as, for example, an examination system in insurance/financial business, an order-receiving/shipping system, a slip examination system and a group-work planning system in manufacturing business, there is work form in which a large number of workers join for execution of data inputting, editing and confirming, management, and so on. Recently, there has been already used a so-called work flow system in which such work form is carried out through a computer network to thereby attain reduction and deletion of documents etc., and, accordingly, attain shortening of the time required for completion of the work and reduction of the number of work steps.

In such a type work flow system as described above, it is conventionally general that data are directly circulated and processed to respective workers without any division. Accordingly, when one worker is updating data, other workers cannot update the data. This is because there is a possibility of occurrence of contradiction in data after updated when, for example, two workers perform processing on one and the same portion of the data in the manners different from each other. It is therefore difficult to improve work efficiency on the whole of the work flow.

Further, because the contents of the data are impartially circulated and disclosed to a large number of workers, it is impossible to carry out operations such as an operation of preliminarily limiting the range of disclosure of the data contents or the like on the basis of information concerning priorities of the workers in an organization, or the like. Accordingly, there is inconvenience in management of the security of data.

On the other hand, a technique disclosed in, for example, JP-A-6-131395 is known with respect to division and connection of data in an information processing system. In the conventional technique, there is, however, carried out an operation of comparing data between a file and another file to be connected on the basis of parameter names in the record attribute in the files so that only the record in which data are coincident with each other is determined as a subject of file connection. Accordingly, such a technical problem concerning the connection and separation of data flowing in the aforementioned work flow system has been not recognized though file connection/separation can be generated in a short time.

SUMMARY OF THE INVENTION

An object of the present invention is to provide a work flow system controlling technique by which efficient and flexible work allotting can be achieved in a work flow system.

Another object of the present invention is to provide a work flow system controlling technique by which the improvement of security concerning data to be circulated to a plurality of workers can be achieved.

In order to achieve the above objects of the present invention, in a work flow system for executing beforehand defined work by circulating data to a plurality of workers through an information network, a work flow system manager or each of the workers can define at any time at least one of dividing information and connecting information with respect to data to be processed in the work flow system so that data to be distributed to the respective workers are connected and divided in accordance with the above definition.

Further, according to the present invention, there may be provided means by which a worker currently executing the work grasps the state of the progress of the work executed by the other workers in the work flow system at any time and grasps divided or connected data at any time.

According to the present invention, serial numbers (for example, page numbers) may be automatically set again on a data unit basis (for example, a page basis) in accordance with increase/decrease of the data due to processing effected by the workers in the work flow system.

According to the present invention, any data can be selected from data delivered through a plurality of routes.

According to the present invention, data to be circulated and processed in a computer network can be divided/integrated suitably by defining data dividing/integrating information in advance before the start of work. Thus, processing can be effected flexibly in such a manner that data, for example, to be processed in a work flow system can be divided suitably so as to be delivered to the workers and that data can be connected again after the data are processed parallelly by the plurality of workers. Accordingly, it becomes possible to perform work sharing more effectively than the conventional case so that it is possible to flexibly cope with occurrence of a trouble.

That is, because each worker receives only data allotted to the worker, data can be updated at the same time without giving disturbance to the work allotted to the other workers. Accordingly, the work time can be shortened.

If, for example, the content of data is divided by the level of security, as a result, only art of data can be distributed to the workers selectively in accordance with the level of security of the workers. Accordingly, security concerning data can be improved.

BRIEF DESCRIPTION OF THE DRAWINGS

FIG. 2 is a conceptual view showing an example of a node information management table used in the data flow depicted in FIG. 1;

FIG. 3 is a conceptual view showing an example of a transaction management table used in the data flow depicted in FIG. 1;

FIG. 4 is a conceptual view showing an example of dividing/connecting information management table used in the data flow depicted in FIG. 1;

DESCRIPTION OF THE PREFERRED EMBODIMENT

Embodiment of the present invention will be described below in detail with reference to the drawings.

Figure 5:
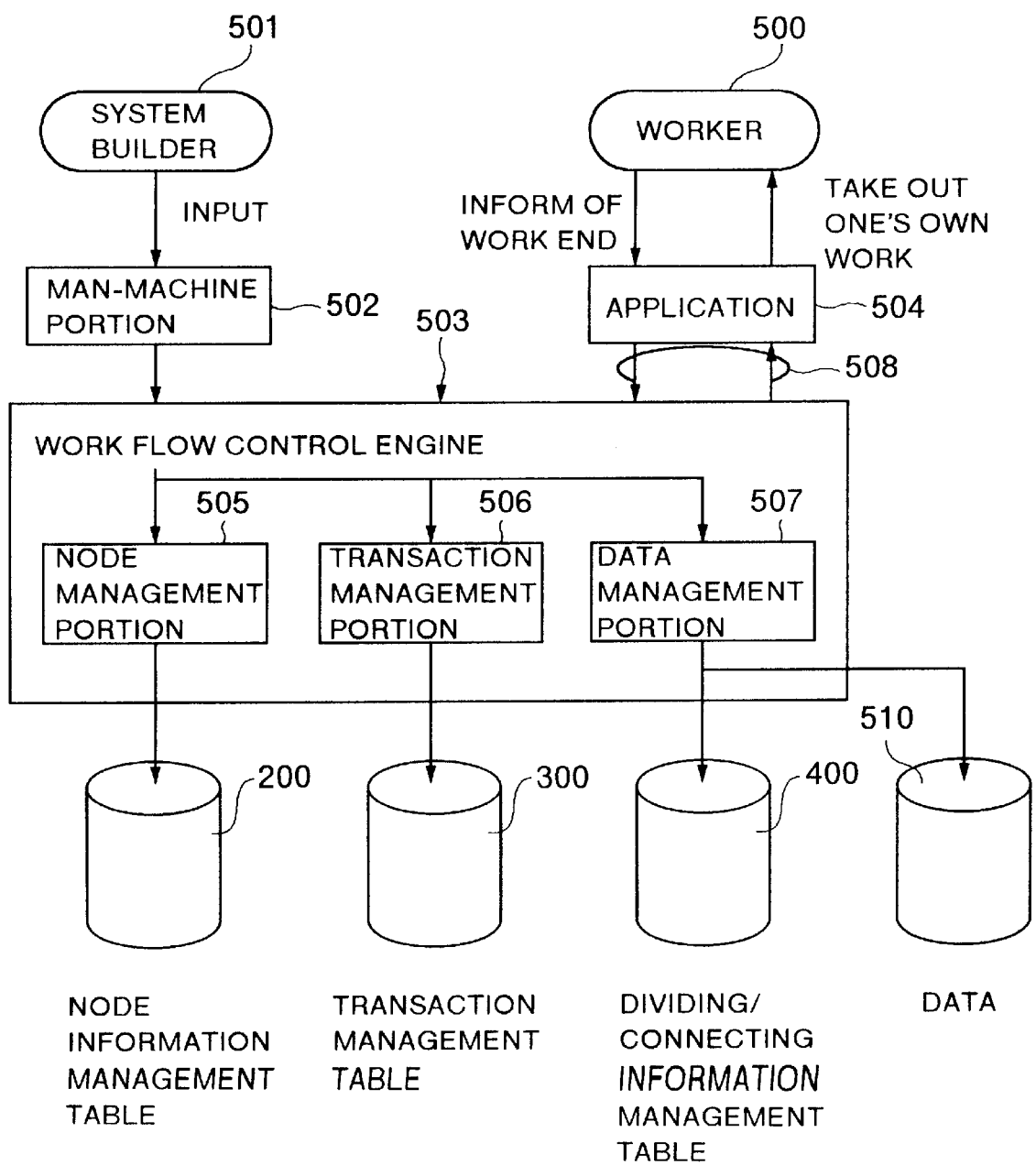
FIG. 5 is a conceptual view showing the configuration of the work flow system according to an embodiment of the present invention.

Referring now to FIG. 5, the configuration of a work flow system as an embodiment of the present invention will be described. Individual workers 500 are connected to a work flow control engine 503 through an application program 504 and a network 508. As the application program 504, there can be used a lot of software programs for executing data reading/writing and data processing such as an electronic mailing software program, a spread sheet software program, a document processing software program, a data confirming software program, etc. The application program 504 contains an interface which is prepared for updating the operation of the work flow control engine 503.

Further, a man-machine portion 502 is connected to the work flow control engine 503, so that various kinds of information, which will be described later, can be set by a system builder 501 through the man-machine portion 502.

In this embodiment, the work flow control engine 503 has the control logics of a node management portion 505, a transaction management portion 506 and a data management portion 507. These parts execute the setting and controlling of the functions of the work flow system by making access to a node information management table 200, a transaction management table 300 and a dividing/connecting information management table 400, respectively, which will be described later and which are, for example, set in an external storage device. Data managed by the data flow control engine 503 are stored in a memory 510. Incidentally, one and the same storage unit may be used for the tables 200, 300 and 400 and the memory 510.

Figure 1:
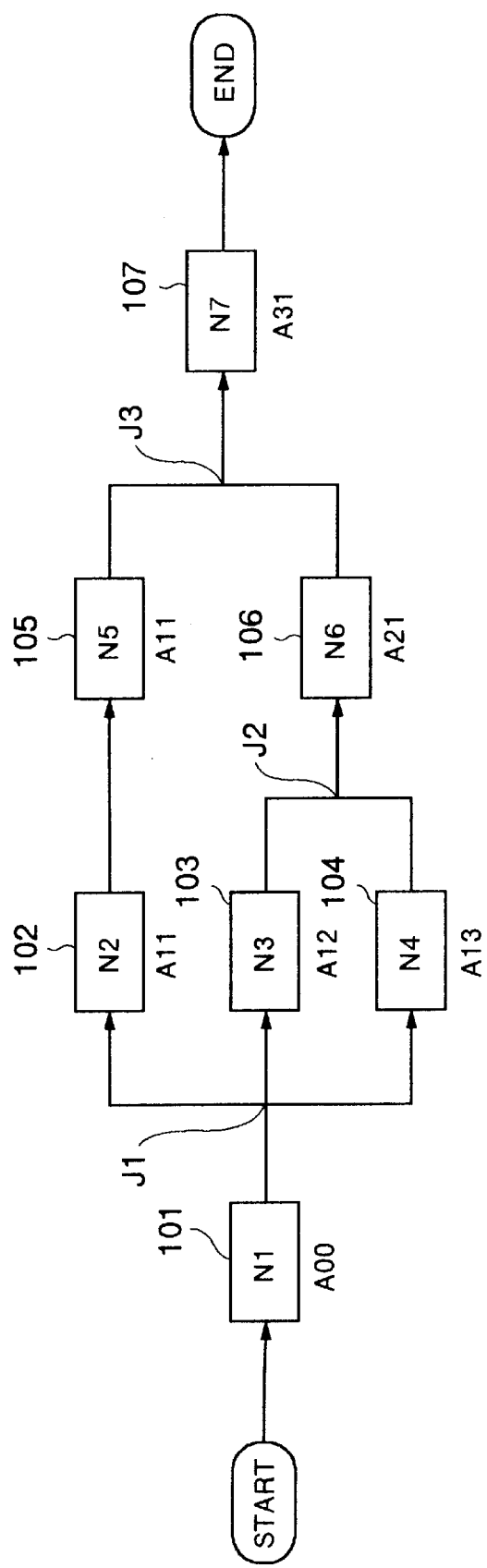
FIG. 1 is a conceptual view showing a flow of data in a work flow system according to an embodiment of the present invention.

Referring next to FIG. 1, an example of the data flow on the whole of the work flow system in this embodiment will be described briefly. Portions represented by the boxes in FIG. 1 are made nodes, respectively. At a point of time when data is delivered to each node, a person (worker 500) in charge for each node executes processing. In FIG. 1, after the completion of processing in a node N1 (101), data is divided so as to be distributed to nodes N2 (102), N3 (103) and N4 (104). The data thus divided and distributed to the nodes N2, N3 and N4 are started to be processed. Further, at a point of time when both data processing in the node N3 and data processing in the node N4 are completed, data processing in the node N6 (106) is started. In this embodiment, the flow of data in the respective nodes N1 to N7 is referred to as work flow. Incidentally, J1 is referred to as branch point, and J2 and J3 are referred to as connection points.

FIG. 2 shows a node information management table 200 for managing the definition of the work flow depicted in FIG. 1. In FIG. 2, the entry 201 shows the name of each node, the entry 202 designates the name of a worker allocated to the node or the name of a section or group to which a plurality of workers allocated to the node belong, the entry 203 shows a node in which data processing is executed just before data processing in each node, the entry 204 shows a node in which data processing is executed just after data processing in each node, and the entries 205 and 206 show flag information for indicating the presence/absence of execution of data dividing/connecting in each node.

FIG. 3 shows a transaction management table 300 for managing transactions (every significant processing unit) executed on the basis of the definition of the work flow depicted in FIG. 1. The entry 301 shows the ID (identification information) of each transaction, the entry 302 shows each node name, the entry 303 shows the state of progress of each node, and the entries 304 and 305 show information of a data start page and a data end page in data given to each node, respectively. Incidentally, any information may be used in the entries 304 and 305 if data sectioning can be specified. Besides the number of pages in general form, or the like, for example, the number of lines in a page may be expressed as the information or, in the case where the application program 504 is a spread sheet software program or a relational database software program, the range of data cells may be expressed in the information.

In the case of a transaction T1, it is apparent from FIG. 1 that nodes N6 and N7 are in a state of waiting for the completion of data processing in the node N4 because data processing in the node N4 is being currently executed. To move the work flow ahead from this state, the work flow control engine 503 makes a judgment by referring to the transaction management table 300 in FIG. 3 as to whether data processing in the node N4 is completed or not. When data processing in the node N4 is completed, data processing in the next node is started. To start the next work, the work flow control engine 503 recognizes, by referring to the node information management table 200 in FIG. 2, the fact that the next node to be started is the node N6 on the basis of the node information after the entry 204 in the nodes N3 and N4. In the same manner as described above, at a point of time when the data processing in the node N6 is completed, data processing in the node N7 is started.

This embodiment is designed so that not only the whole of data to be processed in a work flow defined in FIGS. 1 to 4 can be divided suitably but also the thus divided data can be connected suitably.

In FIG. 1, Ann given to the lower portion of each box shows data to be processed in each node. In this case, data A00 (that is, the whole of data) processed in the node N1 is divided into three data A11, A12 and A13, so that the data A11, A12 and A13 are delivered to the nodes N2, N3 and N4 respectively. The data A12 and A13 after the completion of processing in the nodes N3 and N4 are connected to each other in the node N6 to form data A21. On the other hand, the data A11 which has passed through the nodes N2 and N5 is connected to the data A21 given from the node N6 in the node N7 to thus finally form data A31.

FIG. 4 shows a dividing/connecting information management table 400 for controlling such data dividing/connecting. In this embodiment, not only the dividing/connecting information management table 400 is generated by the work flow control engine 503 on the basis of information inputted by system builder 501 through the man-machine portion 502 at the time of system configuration but also this table 400 can be updated by the persons (workers 500) in charge of the nodes N1 to N7 if there is somewhat necessity in the execution of the work flow. In this case, however, only data diving/connecting information in a node in which data processing will be started after the completion of processing in the node allotted to the worker, can be changed by the person in charge of the node.

In the dividing/connecting information management table 400, the entry 401 shows the name of each data generated in division/connection. Incidentally, the data name suffix is added to the data name of the transaction which flows in practice. For example, assuming now that the name of data to be processed by the transaction T1 is X, the real data names are expressed in X00, X11, X12, X13 . . . , or the like. The entry 402 shows the name of each node. The entry 403 shows the number of divisions of data. The entry 404 shows a list of data generated by division, and the entry 405 shows a list of data connected. The entry 406 shows the division start position of data divided, and the entry 407 shows the division end position. The entry 408 shows a connecting sequence of data when data connecting is executed.

In this case, data A00 (that is, whole data) processed in the node N1 in FIG. 1 is divided into three data by the work flow control engine 503 on the basis of the dividing instruction in the entry 205 in the node information management table 200 in FIG. 2 and the number of divisions in the entry 403 in the dividing/connecting information management table 400 in FIG. 4. In this occasion, the work flow control engine 503 obtains data dividing information of data start positions S11 to S13 and data end positions E11 to E13 with respect to data A00 having a data start position S00 and a data end position E00 by referring to the entries 406 and 407 which shows data start positions and data end positions with respect to data to be divided, respectively. With respect to the data A00 to be divided, data in a range of from S11 to E11, data in a range of from S12 to E12 and data in a range of from S13 to E13 are determined as A11, A12 and A13, respectively, and stored in the memory 510 on the basis of the divided information data.

On the other hand, in the node N6 in FIG. 4, connection of data A12 and A13 is indicated in the entry 206 in FIG. 2. The two data A12 and A13 are connected by the work flow control engine 503 in the sequence designated by the entry 408 on the basis of the entry 405 and stores the thus generated data as A21 in the memory 510 by referring to the entry 401. In the case where processing in the node N3 or N4 is being currently executed, the work flow control engine 503 does not start this process. Incidentally, in the case where increase/decrease of data occurs in each node due to worker's data processing, the work flow control engine 503 automatically updates the data start and end points in the transaction management table 300 and the dividing/connecting management table 400.

Referring again to FIG. 5, the operation of the work flow control engine 503 using various kinds of tables in FIGS. 2, 3 and 4 will be described below. When the system builder 501 builds a system before the application programs are started by the respective workers, the system builder 501 inputs setting of nodes N1 to N7 and data dividing/connecting information in the respective nodes by using the man-machine portion 502. The work flow control engine 503 writes information in the various kinds of tables shown in FIGS. 2, 3 and 4 on the basis of this information.

In the case where a work list to be executed in the node is requested from the worker 500 through the application program 504 after the start of the application program, the work flow control engine 503 returns the work list in the node and the data to be processed by referring to the node management portion 505, the transaction management portion 506 and the data management portion 507. When processing is completed by the worker 500 on the basis of the information received from the work flow control engine 503, work end information is delivered to the work flow control engine 503 through the application program 504. The work flow control engine 503 updates the information in each of the node information management table 200, the transaction management table 300 and the dividing/connecting information management table 400 through the node management portion 505, the transaction management portion 506, and the data management portion 507 on the basis of this information.

Figure 6:
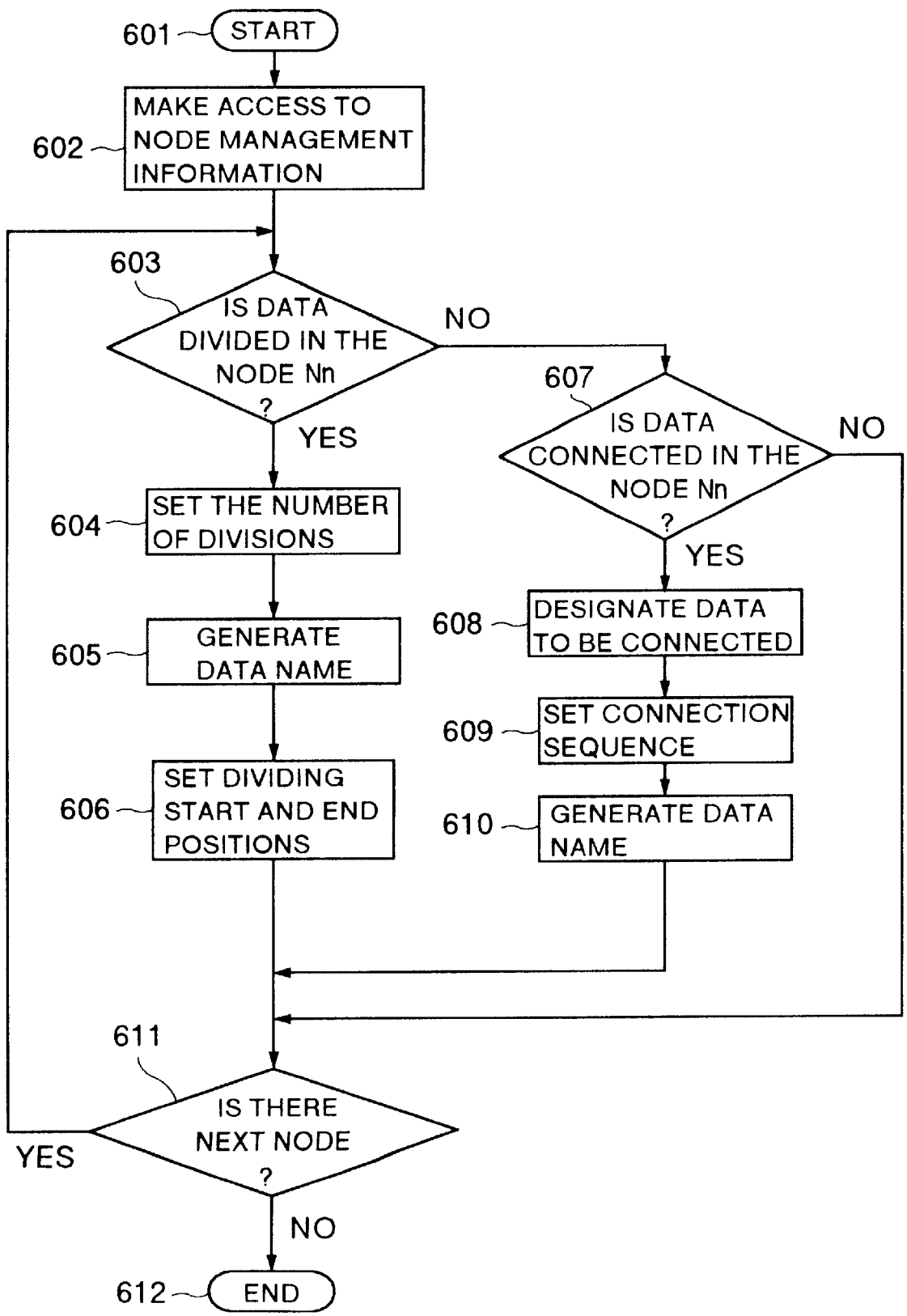
FIG. 6 is a flow chart showing an example of an input process executed by a system builder in the embodiment of the present invention depicted in FIG. 5.

FIG. 6 is a flow chart of the work flow control engine 503 for generating data dividing/connecting information on the basis of information inputted through the man-machine by the system builder when the system is built.

When generation of data dividing/connecting information is started in step 601, the node information management table 200 in FIG. 2 is generated in step 602. In the next step 603, a judgment is made on the basis of information inputted by the system builder 501 as to whether division of data is requested in the node or not. If division is requested, the number of divisions designated by the system builder 501 is set in the tables 200 and 400 in step 604. Further, data suffix names required by division are generated in step 605, and data start and end positions generated by division as designated by the system builder 501 are set in step 606, in the tables 300 and 400 with respect to respective data.

On the other hand, if division is not selected in the step 603, the work flow control engine 503 makes a judgment on the basis of the information inputted from the system builder 501 as to whether data connecting is to be executed or not in step 607. If data connecting is to be executed, steps 608 to 610 are executed so that the information inputted from the system builder 501 is written into the node information management table 200. That is, a list of data to be connected is generated in step 608 and a data connecting sequence is set according to the order designated by the system builder 501 in step 609. The data suffix name of data obtained by connection is generated in step 610.

If the judgment in the step 607 indicates that data connecting is not to be executed, data dividing/connecting is not effected and the situation of this routine skips over the steps 608 to 610.

When dividing/connecting information with respect to one node is thus written into the dividing/connecting information management table 400 shown in FIG. 4, the situation of the routine goes to step 611. If there is any next node, the series of work from the step 603 is repeated. If there is no next node, the series of work is terminated in step 612.

Figure 7:
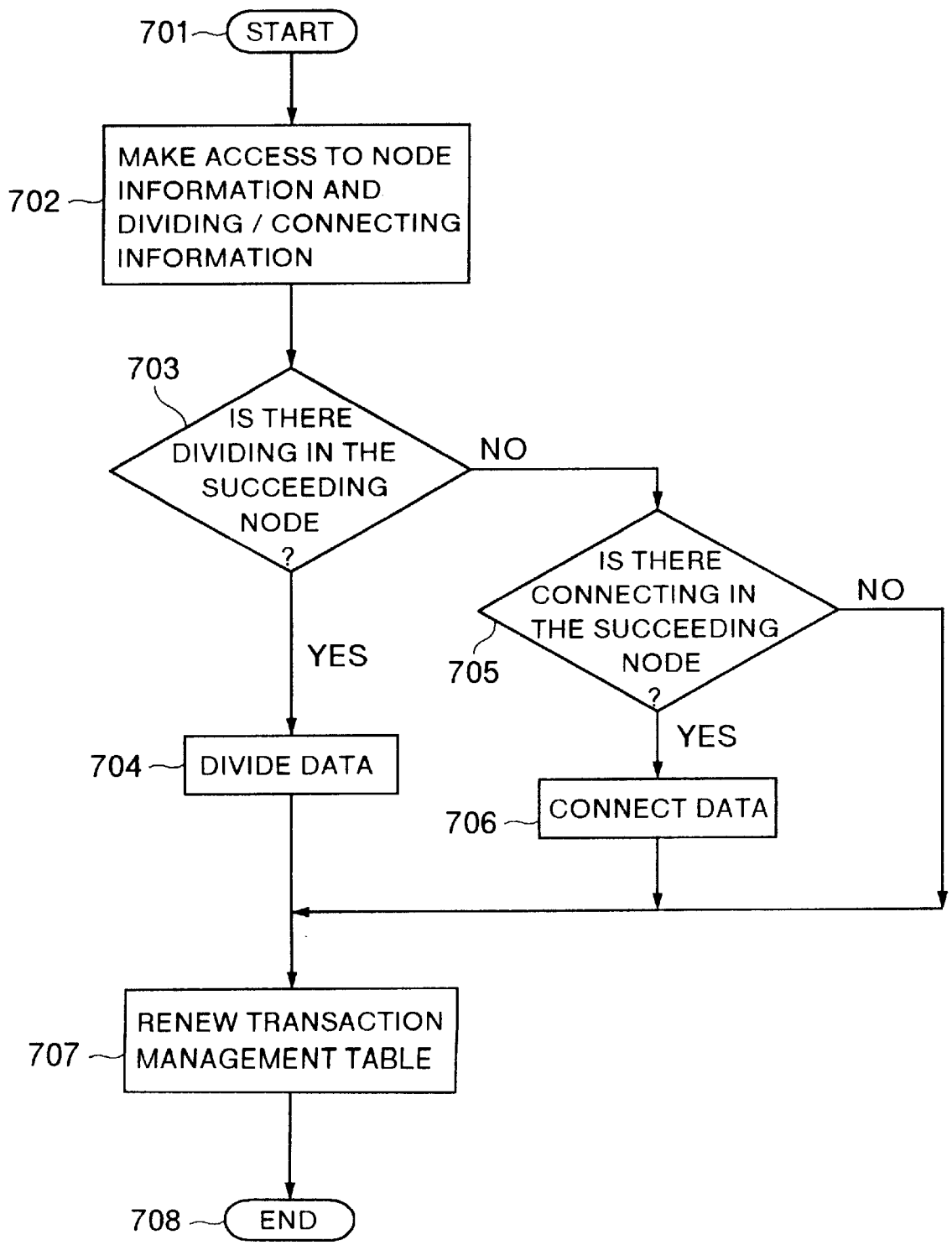
FIG. 7 is a flow chart showing an example of an input process executed by each worker in the embodiment of the present invention depicted in FIG. 5.

FIG. 7 is a flow chart showing an example of a process in which the work flow control engine 503 executes data dividing/connecting in the case where a certain worker requests resetting of data dividing/connecting. In step 701, the process is started in response to the resetting instruction of data dividing/connecting information given by the worker 500 in the node. In step 702, the work flow control engine 503 sets the entries 205 and 206 again on the basis of the instruction of the worker 500 by making access to the node information and the data dividing/connecting information shown in the node information management table 200. In steps 703 and 705, the work flow control engine 503 makes a judgment as to whether data is to be connected in a node next to the node which is being currently subjected to processing by the worker 500. If data is not to be connected in the next node, data is divided newly in step 704 on the basis of the reset information in the entries 404, 406 and 407 in the dividing/connecting information management table 400.

If data are to be connected in the next node, information is rewritten, in step 706, into the entries 405 and 408 of the dividing/connecting information management table 400 on the basis of the reset information. At a point of time when new dividing/connecting information is generated and the worker's resetting in the node is completed as described above, the transaction management table 300 is updated in step 707 and the resetting process is terminated in step 708.

As described above, by the work flow system controlling method in this embodiment, division/connection of data flowing in the plurality of nodes N1 to N7 concerning the work flow can be executed at any time. Accordingly, in the case where, for example, data which can be expected to be processed more efficiently by another worker is found out in a specific node, a flexible measure, in which the data is divided and deliver the divided data to the other worker, can be made easily and speedily. Further, because only necessary data are selectively given to necessary nodes efficiently, parallel processing can be made in a plurality of nodes. Accordingly, not only data processing efficiency in each node is improved but also traffic congestion in network 508 is suppressed.

Further, when data is divided and distributed in accordance with the level of security of the node in the work flow system, specific data can be selectively referred to or updated in the specific node. In other words, an operation of concealing part of data selectively to a specific node can be achieved easily, so that data division is effective also from the point of view of security in the work flow system.

In the case where serial numbers (for example, page numbers) given to data must be changed as a result of data processing executed by a worker allotted to a certain node with respect to data flowing in the work flow system of this embodiment having nodes N1 to N7, the work flow control engine 503 executes a process of automatically resetting the serial numbers as follows.

Figure 8:
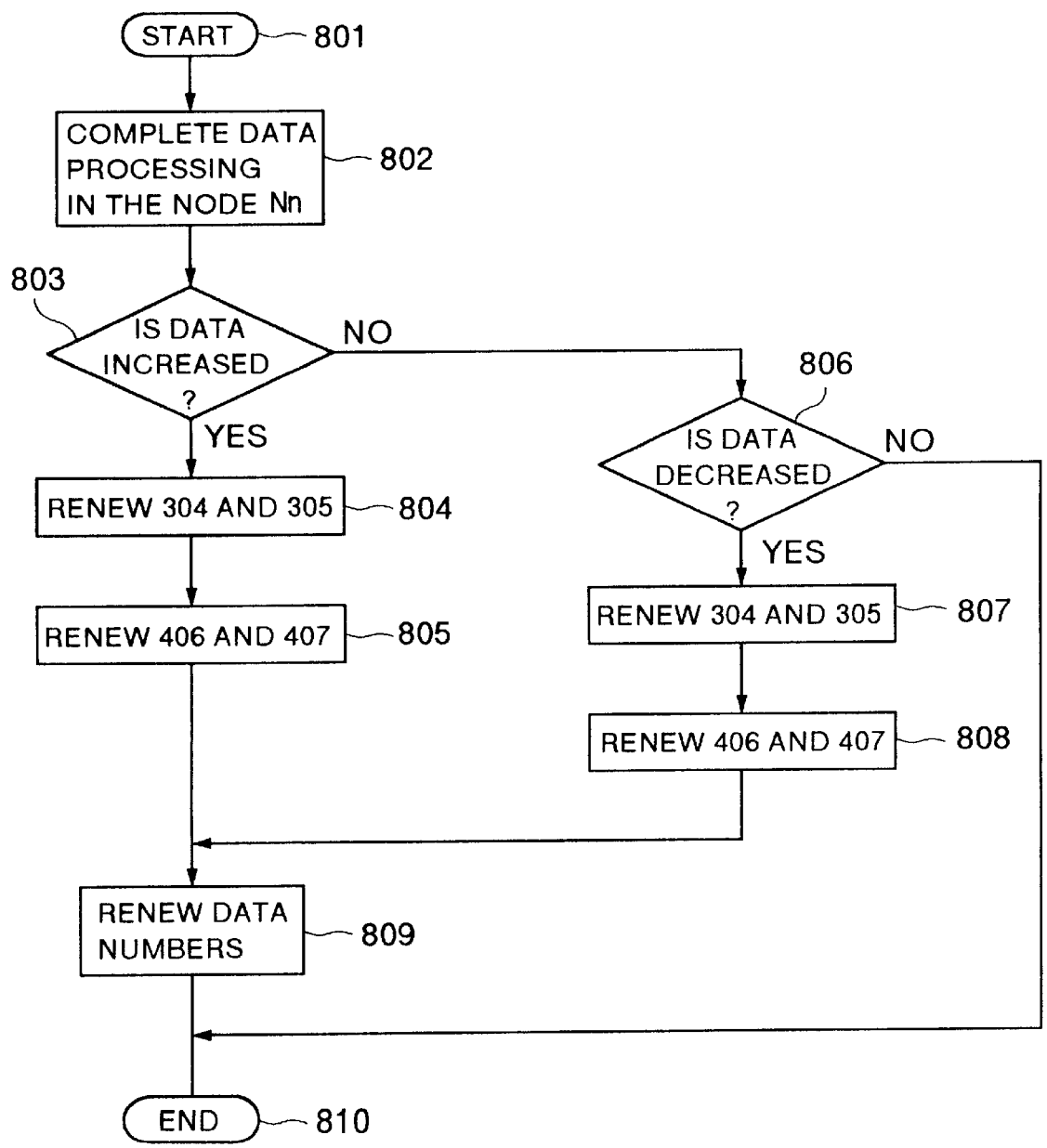
FIG. 8 is a flow chart showing an example of page number changing process in the embodiment of the resent invention depicted in FIG. 5.

FIG. 8 is a flow chart showing an example of the process of automatically setting the serial numbers of data again by the data flow control engine 503.

In FIG. 8, the process is started in step 801. In step 802, a judgment is made as to whether data processing in the node is completed or not. If the judgement proves that data processing is completed, the situation of the process goes to step 803. In step 803, a judgment is made as to whether the data processing in the node increases the quantity of data or not.

If the quantity of data is increased, the situation of the process goes to step 804 in which the data end page for the node in the entry 305 of the transaction management table 300 shown in FIG. 3 is changed and, at the same time, the data start page for the next node in the entry 304 is changed if necessary. Then, in step 805, the similar change to what is effected in the step 804 is applied to the entries 406 and 407 in the dividing/connecting information management table 400 shown in FIG. 4.

If there is no increase in the quantity of data in the step 803, the situation of the process goes to step 806. In the step 806, a judgment is made as to whether the quantity of data is decreased or not. If the quantity of data is not decreased, the situation of the process goes to step 810 and the process is terminated because there is no data change. If the quantity of data is decreased in the step 806, the situation of the process goes to step 807 in which the data end page for the node in the entry 305 of the transaction management table 300 is changed and the data start page for the next node in the entry 304 is changed if necessary. Then, in step 808, the similar change to what is effected in the step 807 is applied to the entries 406 and 407 of the dividing/connecting information management table 400. After all changes are made, the serial numbers of data are updated on the whole of data and then the process is terminated in step 809.

Alternatively, the entries 305 and 407 may be changed in the steps 804 and 807, respectively, and the entries 304 and 406 may be changed in the respective steps 304 and 406.

Description will be made more specifically. For example, assuming now that processing of data in a range of from page 5 to page 8 in the node N4 in the transaction management table 300 shown in FIG. 3 is being currently executed and that the quantity of data is increased in a range of from page 5 to page 10 when this processing is completed, then the work flow control engine 503 first determines the pages (for example, pages 1 and 2) of data A11 in the node N2 by referring to the entries 304 and 305 in step 809 in FIG. 8. Thereafter, the pages (for example, pages 3 and 4) of data A12 in the node N3 are determined on the basis of the pages given to the data in the node N2. Finally, the page numbers of data A21 in the node N6 are determined on the basis of the information concerning the number of pages of the data A11, A12 and A13. For example, the page numbers are reset from pages 5 to 12 to pages 5 to 14. Incidentally, when data are connected in such a manner as in the node N6, the work flow control engine 503 determines the number of pages in data on the basis of the connecting sequence shown in the entries 304, 305 and 408. In this manner, improvement of handling properties and easiness of management can be achieved in processing of data divided and distributed into respective nodes.

On the other hand, an operation of selecting arbitrary data from data received through a plurality of routes in each of nodes N1 to N7 can be achieved as follows. That is, in the step 706 in the flow chart of FIG. 7, connecting information in the dividing/connecting information management table 400 in FIG. 4 is read from the work flow control engine 503 and displayed to the worker 500. The worker 500 can only employ designated data and can abort the other data. As a result, spontaneous diversified data processing can be achieved in each node.

Although the present invention has been specifically described on the basis of an embodiment thereof, it is a matter of course that the invention is not limited to the above-mentioned embodiment and various changes or modifications may be made without departing from the scope and spirit of the invention.

Procedures as shown by flow charts shown in FIGS. 6–8 are stored in the work flow control engine 503 serving as a processor in the form of a medium such as a ROM, a disc or other storage means.

What is claimed is:

1. A method of controlling a work flow system having a plurality of computer nodes connected via an information network, data flowing through said computer nodes so that at least a part of said data is allocated to and processed at each of said computer nodes in accordance with a work defined beforehand, said method executed by a work flow engine comprising the steps of:

storing, into a first memory area, first management information containing information expressing a connecting relation of said plurality of computer nodes arranged in accordance with a flow of said data, said connecting relation containing a joint point between outputs of at least two computer nodes;

storing, into a second memory area, second management information containing information expressing data start and end positions of data allocated to and processed at each of said computer nodes; and concatenating data allocated to and processed at said at least two computer nodes on the basis of said first and second management information to thereby generate at least a part of said data to be allocated to a subsequent computer node connected to said joint point.

2. A method according to claim 1, wherein said second management information contains data connecting information expressing data to be connected.

3. A method according to claim 1, wherein said information expressing data start and end positions is composed of serial numbers given to every predetermined data unit with respect to whole data for executing said work.

4. A method according to claim 3, further comprising the step of resetting said serial numbers correspondingly to increase/decrease of data caused by data processing, after completion of said data processing in at least one node.

5. A method according to claim 1, wherein in said work flow system, second management information concerning node in which processing is to be started after completion of data processing in a another node is changed in said other node.

6. A method according to claim 1, wherein said first and second management information and at least two of said data are stored in one and the same storage device.

7. A method of controlling a work flow system having a plurality of computer nodes connected via an information network, data flowing through said computer nodes so that at least a part of said data is allocated to and processed at each of said computer nodes in accordance with a work defined beforehand, said method executed by a work flow engine comprising the steps of:

storing, into a first memory area, first management information containing information expressing a connecting relation of said plurality of computer nodes arranged in accordance with a flow of said data, and said connecting relation containing a branch point at which an output of a computer node as a branch source is connected to inputs of at least two subsequent computer nodes as branch destinations;

storing, into a second memory area, second management information containing information expressing data start and end positions of data allocated to and processed at each of said plurality of computer nodes, wherein, when at least a part of said data on the output of said branch source node is divided into split data so that the split data are allocated respectively to said branch destination nodes, said second management information contains information expressing data start and end positions of said split data allocated to said branch destination nodes; and after processing of said split data in parallel in said branch destination nodes, updating information expressing the data start and end positions of said split data allocated to said branch destination nodes in said second memory area in accordance with the processing of said split data.

8. A method according to claim 7, wherein said second management information contains data dividing information expressing data to be divided.

9. A method according to claim 7, wherein said data on the output of said branch source node is divided in accordance with a level of security.

10. A method according to claim 7, wherein said information expressing data start and end positions is composed of serial numbers given to every predetermined data unit with respect to whole data for executing said work.

11. A method according to claim 10, further comprising the step of resetting said serial numbers correspondingly to increase/decrease of data caused by data processing, after completion of said data processing in at least one node.

12. A method according to claim 7, wherein in said work flow system, said second management information concerning a node in which processing is to be started after completion of data processing in another node is changed in said other node.

13. A method according to claim 7, wherein said first and second management information and at least two of said data are stored in one and the same storage device.

14. A method of controlling a work flow system having a plurality of computer nodes connected via an information network, data flowing through said computer nodes so that at least a part of said data is allocated to and processed at each of said computer nodes in accordance with a work defined beforehand, said method executed by a work flow engine comprising the steps of:

storing, in a first memory area, first management information containing information expressing a connecting relation of said plurality of computer nodes arranged on the basis of a flow of said data, said connecting relation containing a branch point at which an output of a computer node as a branch source is connected to inputs of at least two computer nodes as branch destinations, and a joint point between outputs of at least computer two nodes as connecting sources;

storing, into a second memory area, second management information containing information expressing data start and end positions of data allocated to and processed at each of said computer nodes, said second management information containing information expressing data start and end positions of allocated split data in respective computer nodes as branch destinations when data on an output of a node as a branch source is divided so that split data are allocated respectively to the nodes as branch destinations;

after processing of said split data in parallel in said branch destination nodes, updating information expressing the data start and end positions of said split data allocated to said branch destination nodes in said second memory area in accordance with the processing of said split data; and concatenating data allocated to and processed at said at least two computer nodes on the basis of said first and second management information to thereby generate at least a part of said data to be allocated to a subsequent computer node connected to said joint point.

15. A method according to claim 14, wherein said second management information contains data dividing information expressing data to be divided, and data connecting information expressing data to be connected.

16. A work flow system comprising:

a plurality of computer nodes at which predefined data processing is performed, said plurality of nodes being connected to each other by an information network, a work flow control engine connected to said information network managing said predefined data processing;

a man-machine portion for inputting data management information for executing said data processing from a system builder to said work flow control engine;

a first memory area for storing first management information containing information expressing the connecting relation of said plurality of computer nodes arranged in accordance with a flow of data for executing said data processing, said connecting relation containing a joint point in outputs of at least two computer nodes; and a second memory area for storing second management information expressing data start and end positions of data to be processed in said plurality of nodes respectively;

wherein said work flow control engine connects data processed in at least two nodes to each other on the basis of said first and second management information to thereby generate data on said joint point.

17. A work flow system comprising:

a plurality of nodes at which predefined data processing is performed, said plurality of nodes being connected to each other by an information network;

a work flow control engine connected to said information network managing said predefined data processing, a man-machine portion for inputting data management information for executing said data processing from a system builder to said work flow control engine;

a first memory area for storing first management information containing information expressing the connecting relation of said plurality of nodes arranged in accordance with a flow of data for executing said data processing, said connecting relation containing a branch point at which an output of a node as a branch source is connected to outputs of at least two nodes as branch destinations; and a second memory area for storing second management information expressing data start and end positions of data to be processed in said plurality of nodes respectively and for storing said second management information containing information expressing data start and end positions of given split data in respective nodes as branch destinations when data on an output of a node as a branch source is divided so that split data are given to nodes as branch destinations;

wherein processing of split data is executed parallelly in said nodes as branch destinations.

18. A medium for use in a work flow system having a plurality of computer nodes connected via an information network, data flowing through said computer nodes so that at least a part of said data is allocated to and processed by each of said computer nodes in accordance with a work defined beforehand, said medium comprising:

a first code section for causing a work flow control engine to store, into a first memory area, first management information containing expressing connecting relation of said plurality of computer nodes arranged in accordance with a flow of said data, said connecting relation containing a joint point between outputs of at least two computer nodes;

a second code section for causing said work flow control engine to store, into a second memory area, second management information containing information expressing data start and end positions of data allocated to and processed by each of said computer nodes; and a third code section for causing said work flow control engine to concatenate data allocated to and processed by said at least two computer nodes on the basis of said first and second management information to thereby generate at least a part of said data to be allocated to a subsequent computer node connected to said joint point.

19. A medium for use in a work flow system in which work defined beforehand with respect to data processing is executed by a plurality of workers in a plurality of nodes connected to each other through an information network, said medium comprising:

a first code section for causing a work flow control engine to store, into a first memory area, first management information containing information expressing connecting relation of said plurality of computer nodes arranged in accordance with a flow of said data, and said connecting relation containing a branch point at which an output of a computer node as a branch source is connected to inputs of at least two subsequent computer nodes as branch destinations;

a second code section for causing said work flow control engine to store, into a second memory area, second management information containing information expressing data start and end positions of data allocated to and processed by each of said plurality of computer nodes, wherein, when at least a part of said data on the output of said branch source node is divided into split data so that the split data are allocated respectively to said branch destination nodes, said second management information contains information expressing data start and end positions of said split data allocated to said branch destination nodes; and a third code section for causing said work flow control engine to perform processing of said split data in parallel in said branch destination nodes, updating information expressing the data start and end positions of said split data allocated to said branch destination nodes in said second memory area in accordance with the processing of said split data.

* * * * *